United States Patent
Yadav et al.

(10) Patent No.: US 10,628,444 B1
(45) Date of Patent: Apr. 21, 2020

(54) INCREMENTAL BACKUP OPERATIONS FOR ON-LINE AVAILABILITY GROUPS

(71) Applicant: EMC Corporation, Hopkinton, MA (US)

(72) Inventors: Sunil Kumar Yadav, Bangalore (IN); Pradeep Anappa, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 539 days.

(21) Appl. No.: 15/191,998

(22) Filed: Jun. 24, 2016

(51) Int. Cl.
*G06F 16/00* (2019.01)
*G06F 16/27* (2019.01)
*G06F 16/11* (2019.01)
*G06F 16/28* (2019.01)

(52) U.S. Cl.
CPC .............. *G06F 16/27* (2019.01); *G06F 16/11* (2019.01); *G06F 16/285* (2019.01)

(58) Field of Classification Search
CPC ......... G06F 16/27; G06F 16/11; G06F 16/285
See application file for complete search history.

(56) References Cited

U.S. PATENT DOCUMENTS

| | | | |
|---|---|---|---|
| 8,140,791 B1* | 3/2012 | Greene | G06F 11/1464 711/162 |
| 9,235,606 B1* | 1/2016 | Mooney | G06F 17/30073 |
| 2003/0158873 A1* | 8/2003 | Sawdon | G06F 16/10 |
| 2006/0256712 A1* | 11/2006 | Imajuku | H04J 14/0284 370/218 |
| 2011/0071981 A1* | 3/2011 | Ghosh | G06F 11/2025 707/634 |
| 2011/0072217 A1* | 3/2011 | Hoang | G06F 16/22 711/130 |
| 2013/0138614 A1* | 5/2013 | Travis | G06F 16/278 707/658 |
| 2013/0191831 A1* | 7/2013 | Goyal | G06F 9/46 718/100 |
| 2016/0203201 A1* | 7/2016 | Shi | G06F 17/30578 707/623 |
| 2017/0185488 A1* | 6/2017 | Kumarasamy | G06F 11/1451 |

* cited by examiner

*Primary Examiner* — Tarek Chbouki
(74) *Attorney, Agent, or Firm* — Dergosits & Noah LLP; Todd A. Noah

(57) ABSTRACT

A first agent informs a second agent that a backup file is created for an active copy of a data object in a first node in a cluster of nodes, in response to the first agent determining that the backup file is created for the active copy of the data object in the first node. The second agent instructs a change tracker associated with a passive copy of the data object in a second node in the cluster of nodes to begin tracking changes received from a synchronizer associated with the active copy of the data object in the first node, wherein tracked changes received from the synchronizer associated with the active copy of the data object in the first node enables a next backup operation performed on the data object to be performed as an incremental backup operation on the data object in the second node.

20 Claims, 3 Drawing Sheets

INCREMENTAL BACKUP OPERATIONS FOR ON-LINE AVAILABILITY GROUPS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. A backup/restore application may create a full backup file that includes all of a data object or the parts of the data object that are used. A backup/restore application may also create an incremental backup file that includes only changes made to the data object since a selected time, such as a previous backup of the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

Some application servers, such as Microsoft's Exchange Server, include database availability groups, which offer a high-availability and disaster-recovery solution that provides an enterprise-level alternative to database mirroring. A database availability group maximizes the availability of a set of user databases for an enterprise, and supports a failover environment for a discrete set of user databases that fail over together from one server, or node, in a cluster to another server, or node, in the cluster. A database availability group supports a set of read-write active copies of a database and other sets of corresponding passive copies of the database.

DETAILED DESCRIPTION

Figure 1:
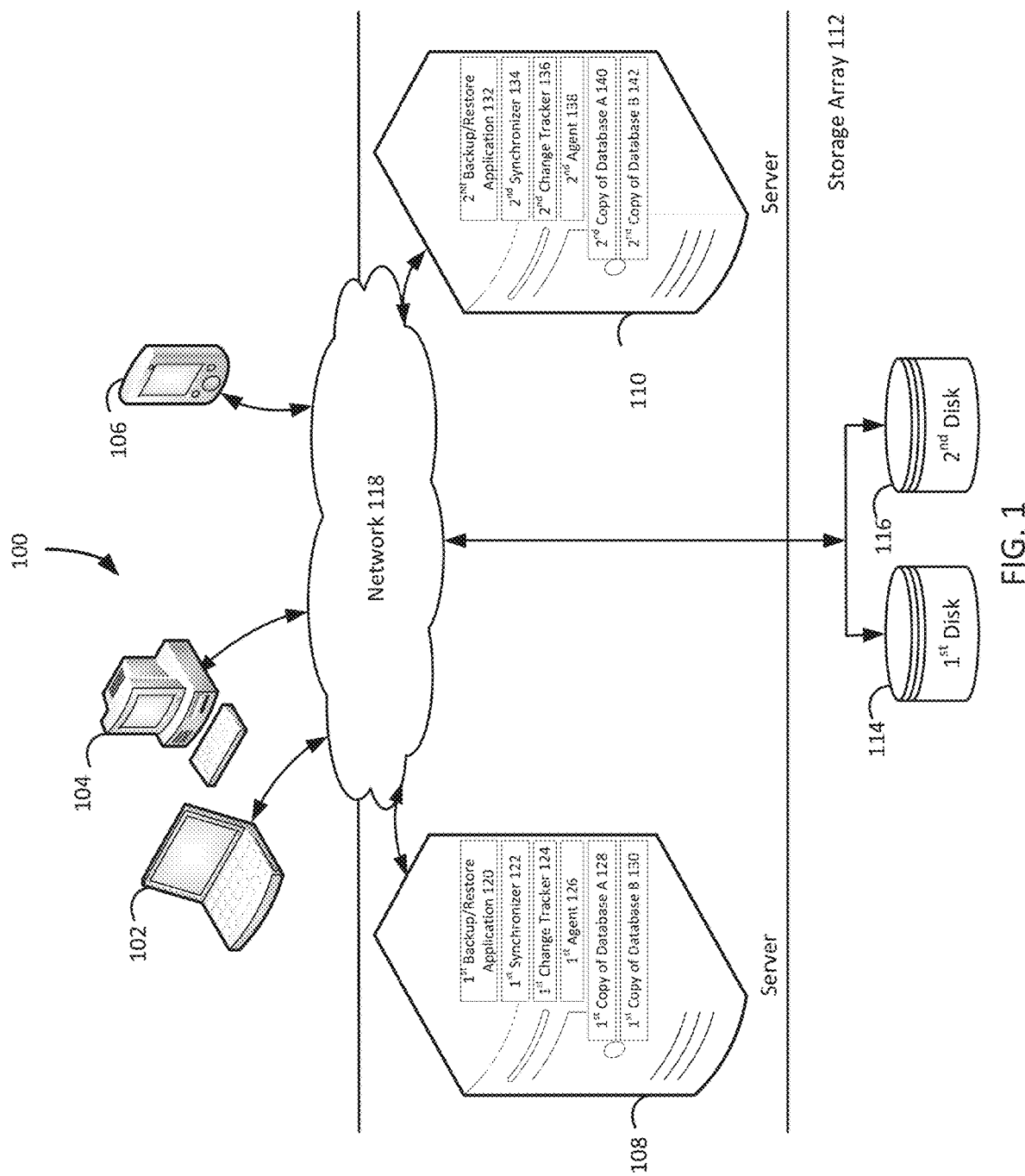
FIG. 1 illustrates a block diagram of an example system for incremental backup operations for on-line availability groups, under an embodiment.

A backup/restore application can create a full backup file on all of a data object or create an incremental backup file on only changes made to the data object since a selected time, such as a previous backup of the data object, from any node in a cluster of nodes that implements an on-line availability group. For example, at 12:00 A.M. a backup/restore application creates a full backup of an active copy of an email database stored by a first node. At 1:00 A.M. the first node's active copy of the email database becomes a passive copy of the email database and a second node's passive copy of the email database becomes the active copy of the email database. The second node's passive copy of the email database had been kept synchronized with the first node's active copy of the email database. However, the second node has no record of when the most recent backup file was created for first node's active copy of the email database, much less any record of the changes made to the email database since the most recent backup file was created. Therefore, at 2:00 A.M. when the backup/restore application is scheduled to create an incremental backup file for the email database, the backup/restore application has to create a full backup file for the second node's active copy of the email database, even though a full backup file was created for the email database only two hours ago. The backup/restore application has to create a full backup file for the second node's active copy of the email database because the second node has no record of the changes made to the email database since the most recent backup file was created, and a record of these changes is required for creating an incremental backup file. The node that has the active copy of a database may frequently switch for a database availability group. These frequent switches in the nodes with the active copy of the database may result in inefficiently creating a significant number of full backup files for the database when only a relatively small amount of the database has changed, thereby wasting substantial amounts of resources such as memory, bandwidth, CPU utilization, and storage. Furthermore, since each node may support multiple databases, the backup/restore application may not be able to create all of these full backup files within the time required for backups, or backup window, which is specified by service level agreements.

Embodiments herein enable incremental backup operations for on-line availability groups. A first agent informs a second agent that a backup file is created for an active copy of a data object in a first node in a cluster of nodes, in response to the first agent determining that the backup file is created for the active copy of the data object in the first node. The second agent instructs a change tracker associated with a passive copy of the data object in a second node in the cluster of nodes to begin tracking changes received from a synchronizer associated with the active copy of the data object in the first node, wherein tracked changes received from the synchronizer associated with the active copy of the data object in the first node enables a next backup operation performed on the data object to be performed as an incremental backup operation on the data object in the second node.

Based on the previous example, a first agent in the first node of the cluster of nodes determines that at 12:00 A.M. the full backup file is created for the first node's active copy of the email database, and informs a second agent in the second node of the cluster of nodes that at 12:00 A.M. the full backup file is created for the first node's active copy of the email database. The second agent instructs the change tracker for the second node's passive copy of the email database to begin tracking changes received from the synchronizer for the first node's active copy of the email database. The tracked changes that the second node receives from the synchronizer for the first node's active copy of the email database enables the 2:00 A.M. backup operation performed on the email database to be performed as an incremental backup operation on the second node's now active copy of the database. In contrast to previous systems for on-line availability groups, which always create a full backup file of a newly activated copy of a data object, the agents enable the more efficient creation of an incremental backup file of a newly activated copy of a data object.

FIG. 1 illustrates a diagram of a system for incremental backup operations for on-line availability groups, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, and a storage array 112 that may be provided by a hosting company. Although FIG. 1 depicts the first client 102 as a laptop computer 102, the second client 104 as a personal computer 104, and the third client 106 as a personal digital assistant 106, each of the clients 102-106 may be any type of computer, such as a server. The storage array 112 includes a first disk 114 and a second disk 116. The clients 102-106, the servers 108-110, and the storage array 112 communicate via a network 118. Although FIG. 1 depicts the system 100 with three clients 102-106, two servers 108-110, one storage array 112, two disks 114-116, and one network 118, the system 100 may include any number of clients 102-106, any number of servers 108-110, any number of storage arrays 112, any number of disks 114-116, and any number of networks 118. The clients 102-106 and the servers 108-110 may each be substantially similar to the system 300 depicted in FIG. 3 and described below.

The first server 108, which may be referred to as the first node 108, includes a first backup/restore application 120, a first synchronizer 122, a first change tracker 124, a first agent 126, a first copy of database A 128, and a first copy of database B 130. Similarly, the second server 110, which may be referred to as the second node 110, includes a second backup/restore application 132, a second synchronizer 134, a second change tracker 136, a second agent 138, a second copy of database A 140, and a second copy of database B 142. The first change tracker 124 and the second change tracker 136 may be referred to as the first block-based backup write tracker 124 and the second block-based backup write tracker 136. Although FIG. 1 depicts the first node 108 with first copies of two databases 128-130 and the second node 110 with second copies of two databases 140-142, the first node 108 may have first copies of any number of databases 128-130 and the second node 110 may have second copies of any number of databases 140-142. Although these examples describe the nodes 108 and 110 providing on-line availability to databases in a database availability group, the nodes 108 and 110 may provide on-line availability for any data object, such as an application. Furthermore, any one of the copies of database A 128 and 140 may be the active copy of database A, and any one of the copies of database B 130 and 142 may be the active copy of database B. Since the system 100 may include any number any number of nodes 108-110, any one of the any number of nodes 108-110 may have the active copy of a database while the remaining nodes each have a passive copy of the database. For example, the first node 108 and the second node 110 may be part of a cluster of 16 nodes, and only the ninth node has an active copy of database X, while the other 15 nodes in the cluster each have a corresponding passive copy of database X.

A backup/restore application, such as the first backup/restore application 120 and the second backup/restore application 132, creates backup files of database A and database B, and executes a rollback based on the backup files. A backup/restore application may provide centralized administration, such as scheduling, monitoring, and managing backup operations and backup files. A backup/restore application can enable the storing of backup operation schedules, client policies, and client configurations. A backup/restore application maintains a local database of all processes that execute on a node. A backup/restore application executes server-side processes for a system administrator's graphical management console, which may enable the system administrator to use command line interface tools for queries. For example, a system administrator identifies the first copy of database A 128 and the first copy of database B 130 registered with the first node 108.

Although FIG. 1 depicts the first backup/restore application 120 residing completely on the first node 108 and the second backup/restore application 132 residing completely on the second node 110, the backup/restore applications 120 and 132 may reside in any combination of partially on the first node 108 and/or the second node 110, and/or partially elsewhere. Even though the following paragraphs describe EMC Corporation's Avamar® backup/restore application and EMC Corporation's NetWorker® backup/restore application as examples of the backup/restore applications 120 and 132, the backup/restore applications 120 and 132 may be any other backup/restore application which provides the backup/restore functionalities described in the Background section.

The backup/restore applications 120 and 132 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore applications 120 and 132 may be an EMC Corporation's NetWorker® backup/restore application, which is a suite of enterprise level data protection software that unifies and automates backup to tape, disk-based, and flash-based storage media across physical and virtual environments for granular and disaster recovery.

Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

An agent determines that a backup file is created for an active copy of a data object in a node, in a cluster of nodes, which is executing the agent. For example, the first agent 126 in the first node 108 determines that at 12:00 A.M. the first backup/restore application 120 used a volume snapshot service to create a full backup file for the active first copy of database A 128 in the first node 108. Continuing the example, the first backup/restore application 120 may store the full backup file for the active first copy of database A 128 on the first disk 114 and/or the second disk 116 of the storage array 112. Having determined that a backup file is created for an active copy of a data object, an agent informs all other agents corresponding to passive copies of the same data object that the backup file is created for the active copy of the data object in the node executing the agent. For example, the first agent 126, which is executed by the first node 108 in the cluster of nodes 108 and 110, uses an application programming interface to inform the second agent 138, which is executed by the second node 110 in the cluster of nodes 108 and 110, that at 12:00 A.M. the full backup file is created for the active first copy of database A 128 in the first node 108.

After being informed that a backup file is created of an active copy of a data object in a remote node, each informed agent instructs a corresponding change tracker for a corresponding passive copy of the data object in a corresponding node in a cluster of nodes to begin tracking changes received from the synchronizer for the active copy of the data object in the remote node in the cluster of nodes. For example, the second agent 138 in the second node 110 instructs the second block-based backup write tracker 136 for the passive second copy of database A 140 in the second node 110 to begin tracking changes received from the first synchronizer 122 for the active first copy of the database A 128 in the first node 108. A node with an active copy of a data object uses a synchronizer implemented via an application programming interface to keep all passive copies of the data object in other nodes synchronized with changes made to the active copy of the data object. All nodes in the cluster of nodes now have the same records of changes to the active copy of the data object that occurred since the most recent backup file was created of the active copy of the data object. An agent may send bitmaps maintained by a change tracker in the agent's node to other agents in other nodes.

The tracked changes received from the synchronizer for the active copy of the data object in the remote node enables the next backup operation performed on the data object to be performed as an incremental backup operation on the data object in the local node. Continuing the previous example, at 1:00 A.M. the first copy of database A 128 in the first node 108 becomes a passive copy of database A and the second copy of database A 140 in the second node 110 becomes the active copy of database A. Consequently, the tracked changes that the second node 110 received from the first synchronizer 122 for the active first copy of the database A 128 in the first node 108 enables a 2:00 A.M. backup operation performed on a copy of database A to be the second backup/restore application 132 performing an incremental backup operation on the now active second copy of database A 140 in the second node 110. In contrast to previous systems for on-line availability groups, which always create a full backup file of a newly activated copy of a data object, the agents enable the more efficient creation of an incremental backup file of a newly activated copy of a data object.

Once the active copy of a data object and a passive copy of the data object switches in their corresponding nodes, the corresponding agents switch their roles. After instructing a change tracker to begin tracking changes, an agent can determine that a backup file is created for an active copy of a data object in the node executing the agent. For example, the second agent 138 in the second node 110 determines that at 2:00 A.M. the second backup/restore application 132 created the incremental backup file for the now active second copy of database A 140 in the second node 110. Having determined that a backup file is created of an active copy of a data object, an agent can inform all other agents corresponding to passive copies of the same data object that the backup file is created for the active copy of the data object in the node executing the agent. For example, the second agent 138, which is executed by the second node 110 in the cluster of nodes 108 and 110, uses an application programming interface to inform the first agent 126, which is executed by the first node 108 in the cluster of nodes 108 and 110, that at 2:00 A.M. the incremental backup file is created for the active second copy of database A 140 in the second node 110.

After being informed that a backup file is created of an active copy of a data object in a remote node, each informed agent can instruct a corresponding change tracker associated with a corresponding passive copy of the data object in a corresponding node in a cluster of nodes to begin tracking changes received from a synchronizer associated with the active copy of the data object in the remote node in the cluster of nodes. For example, the first agent 126 in the first node 108 instructs the first block-based backup write tracker 124 for the now passive first copy of database A 128 in the first node 108 to begin tracking changes received from the second synchronizer 134 for the now active second copy of the database A 140 in the second node 110. All nodes in the cluster of nodes now have the same records of changes to the active copy of the data object that occurred since the most recent backup file was created of the active copy of the data object.

The tracked changes received from the synchronizer for the active copy of the data object in the remote node enables the next backup operation performed on the data object to be performed as an incremental backup operation on the data object in the local node. Continuing the previous example, at 3:00 A.M. the second copy of database A 140 in the second node 110 becomes a passive copy of database A and the first copy of database A 128 in the first node 108 becomes the active copy of database A. Consequently, the tracked changes that the first node 108 received from the second synchronizer 134 for the active second copy of the database A 140 in the second node 110 enables a 4:00 A.M. backup operation performed on a copy of database A to be the first backup/restore application 120 performing an incremental backup operation on the now active first copy of database A 128 in the first node 108.

Figure 2:
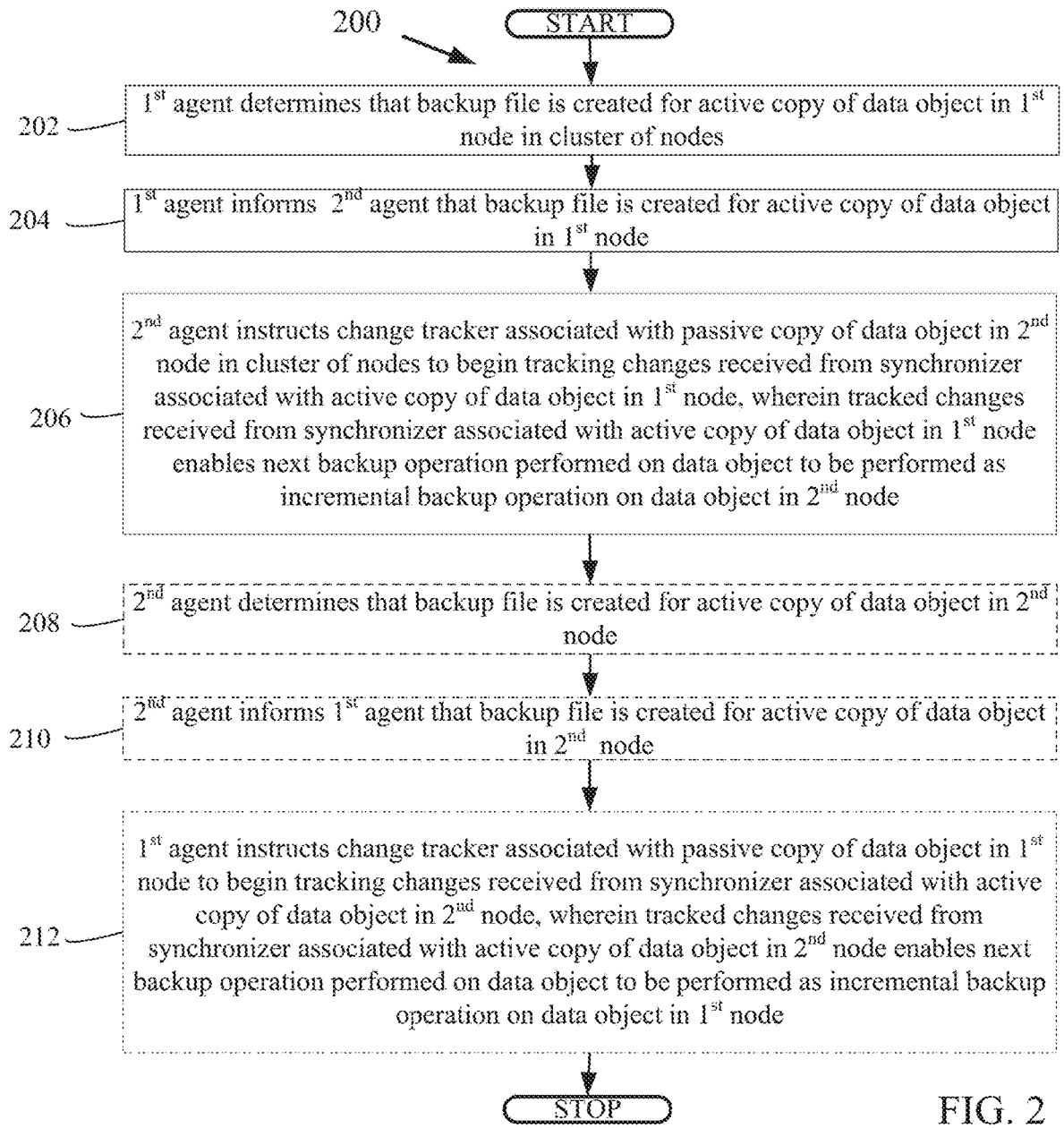
FIG. 2 is a flowchart that illustrates a method of incremental backup operations for on-line availability groups, under an embodiment.

FIG. 2 is a flowchart that illustrates a method for incremental backup operations for on-line availability groups, under an embodiment. Flowchart 200 illustrates method acts illustrated as flowchart blocks for certain steps involved in and/or between the clients 102-106 and/or the servers 108-110 of FIG. 1.

A first agent determines that a backup file is created for an active copy of a data object in a first node in a cluster of nodes, block 202. For example, the first agent 126 determines that at 12:00 A.M. the first backup/restore application 120 created a full backup file for the active first copy of database A 128.

Having determined that a backup file is created, a first agent informs a second agent that the backup file is created for an active copy of a data object in a first node in a cluster of nodes, block 204. For example, the first agent 126 informs the second agent 138 that at 12:00 A.M. the full backup file is created for the active first copy of database A 128.

After being informed that a backup file is created, a second agent instructs a change tracker associated with a passive copy of a data object in a second node in a cluster of nodes to begin tracking changes received from a synchronizer associated with an active copy of the data object in a first node in the cluster of nodes, wherein tracked changes received from the synchronizer associated with the active copy of the data object in the first node enables a next backup operation performed on the data object to be performed as an incremental backup operation on the data object in the second node, block 206. For example, the second agent 138 instructs the second block-based backup write tracker 136 for the passive second copy of database A 140 to begin tracking changes received from the first synchronizer 122 for the active first copy of the database A 128. Continuing this example, at 1:00 A.M., the first copy of database A 128 becomes a passive copy of database A and the second copy of database A 140 becomes the active copy of database A. Consequently, the tracked changes that the second node 110 received from the first synchronizer 122 for the active first copy of the database A 128 enables a 2:00 A.M. backup operation performed on a copy of database A to be the second backup/restore application 132 performing an incremental backup operation on the now active second copy of database A 140.

After instructing a change tracker to begin tracking changes, a second agent optionally determines that a backup file is created for an active copy of a data object in a second node, block 208. For example, the second agent 138 determines that at 2:00 A.M. the second backup/restore application 132 created the incremental backup file for the now active second copy of database A 140.

Having determined that a backup file is created, a second agent optionally informs a first agent that a backup file is created for an active copy of a data object in a second node, block 210. For example, the second agent 138 informs the first agent 126 that at 2:00 A.M. the incremental backup file is created for the now active second copy of database A 140.

After being informed that a backup file is created, a first agent optionally instructs a change tracker associated with a passive copy of a data object in a first node to begin tracking changes received from a synchronizer associated with an active copy of the data object in a second node, wherein tracked changes received from the synchronizer associated with the active copy of the data object in the second node enables a next backup operation performed on the data object to be performed as an incremental backup operation on the data object in the first node, block 212. For example, the first agent 126 instructs the first block-based backup write tracker 124 for the now passive first copy of database A 128 to begin tracking changes received from the second synchronizer 134 for the now active second copy of the database A 140. Continuing this example, at 3:00 A.M., the second copy of database A 140 becomes a passive copy of database A and the first copy of database A 128 becomes the active copy of database A. Consequently, the tracked changes that the first node 108 received from the second synchronizer 134 for the active second copy of the database A 140 enables a 4:00 A.M. backup operation performed on a copy of database A to be the first backup/restore application 120 performing an incremental backup operation on the now active first copy of database A 128.

Although FIG. 2 depicts the blocks 202-212 occurring in a specific order, the blocks 202-212 may occur in another order. In other implementations, each of the blocks 202-212 may also be executed in combination with other blocks and/or some blocks may be divided into a different set of blocks.

Figure 3:
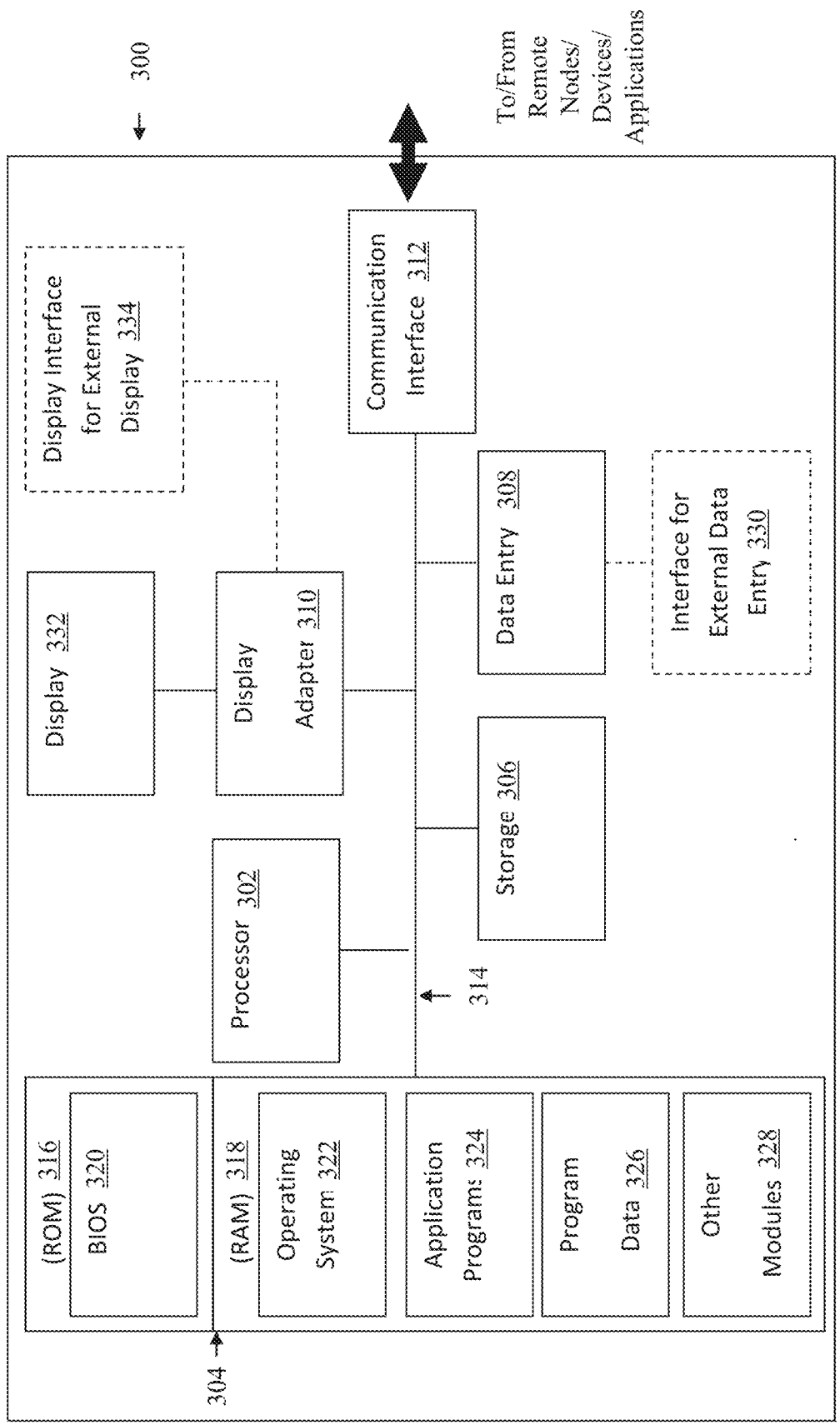
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for incremental backup operations for on-line availability groups, the system comprising:
    a processor-based application, which when executed on a computer, will cause the processor to:
        inform, by a first agent in a first node in a cluster of nodes, a second agent in a second node in the cluster of nodes that a backup file is created for an active copy of a data object in the first node, in response to the first agent determining that the backup file is created for the active copy of the data object in the first node, the second node including a passive copy of the data object;
        instruct, by the second agent, a change tracker associated with the passive copy of the data object in the second node to begin tracking changes received from a synchronizer associated with the active copy of the data object in the first node, wherein tracked changes received from the synchronizer associated with the active copy of the data object in the first node enables a next backup operation performed on the data object to be performed as an incremental backup operation on the data object in the second node; and
        initiate, by the second agent, a synchronizer associated with the active copy of the data object in the second node to send tracked changes associated with the data object to the first node, in response to determining the passive copy of the data object in the second node has transitioned into the active copy of the data object.

2. The system of claim 1, wherein the processor-based application further causes the processor to:
    inform, by the second agent, the first agent that a backup file is created for the active copy of the data object in the second node, in response to the second agent determining that the backup file is created for the active copy of the data object in the second node; and
    instruct, by the first agent, a change tracker associated with a passive copy of the data object in the first node to begin tracking changes received from the synchronizer associated with the active copy of the data object in the second node, wherein tracked changes received from the synchronizer associated with the active copy of the data object in the second node enables a next backup operation performed on the data object to be performed as an incremental backup operation on the data object in the first node.

3. The system of claim 1, wherein the active copy of the data object in the first node and the passive copy of the data object in the second node are associated with an on-line availability group.

4. The system of claim 1, wherein the active copy of the data object in the first node transitions to a passive copy of the data object in the first node.

5. The system of claim 4, wherein the first agent in the first node and the second agent in the second node switch informing and instructing roles, in response to determining the passive copy of the data object in the second node has transitioned into the active copy of the data object, and the active copy of the data object in the first node has transitioned into the passive copy of the data object.

6. The system of claim 1, wherein the first agent is executed in the first node.

7. The system of claim 1, wherein the second agent is executed in the second node.

8. The system of claim 1, wherein the synchronizer associated with the active copy of the data object in the second node sends the tracked changes to the first node using a tracked change bitmap.

9. The system of claim 1, wherein the next backup operation performed on the data object in the second node is performed as the incremental backup operation instead of a full backup operation in response to determining the change tracker associated with the passive copy of the data object in the second node has been initiated.

10. A computer-implemented method for incremental backup operations for on-line availability groups, the method comprising:
    informing, by a first agent in a first node in a cluster of nodes, a second agent in a second node in the cluster of nodes that a backup file is created for an active copy of a data object in the first node, in response to the first agent determining that the backup file is created for the active copy of the data object in the first node, the second node including a passive copy of the data object;
    instructing, by the second agent, a change tracker associated with the passive copy of the data object in the second node to begin tracking changes received from a synchronizer associated with the active copy of the data object in the first node, wherein tracked changes received from the synchronizer associated with the active copy of the data object in the first node enables a next backup operation performed on the data object to be performed as an incremental backup operation on the data object in the second node; and
    initiating, by the second agent, a synchronizer associated with the active copy of the data object in the second node to send tracked changes associated with the data object to the first node, in response to determining the passive copy of the data object in the second node has transitioned into the active copy of the data object.

11. The method of claim 10, wherein the method further comprises:

informing, by the second agent, the first agent that a backup file is created for the active copy of the data object in the second node, in response to the second agent determining that the backup file is created for the active copy of the data object in the second node; and instructing, by the first agent, a change tracker associated with a passive copy of the data object in the first node to begin tracking changes received from the synchronizer associated with the active copy of the data object in the second node, wherein tracked changes received from the synchronizer associated with the active copy of the data object in the second node enables a next backup operation performed on the data object to be performed as an incremental backup operation on the data object in the first node.

12. The method of claim 10, wherein the active copy of the data object in the first node and the passive copy of the data object in the second node are associated with an on-line availability group.

13. The method of claim 10, wherein the active copy of the data object in the first node transitions to a passive copy of the data object in the first node.

14. The method of claim 10, wherein the first agent is executed in the first node.

15. The method of claim 10, wherein the second agent is executed in the second node.

16. A computer program product, comprising a non-transitory computer-readable medium having a computer-readable program code embodied therein to be executed by one or more processors, the program code including instructions to:

inform, by a first agent in a first node in a cluster of nodes, a second agent in a second node in the cluster of nodes that a backup file is created for an active copy of a data object in the first node, in response to the first agent determining that the backup file is created for the active copy of the data object in the first node, the second node including a passive copy of the data object; and instruct, by the second agent, a change tracker associated with the passive copy of the data object in the second node to begin tracking changes received from a synchronizer associated with the active copy of the data object in the first node, wherein tracked changes received from the synchronizer associated with the active copy of the data object in the first node enables a next backup operation performed on the data object to be performed as an incremental backup operation on the data object in the second node; and initiate, by the second agent, a synchronizer associated with the active copy of the data object in the second node to send tracked changes associated with the data object to the first node, in response to determining the passive copy of the data object in the second node has transitioned into the active copy of the data object.

17. The computer program product of claim 16, wherein the program code includes further instructions to:

inform, by the second agent, the first agent that a backup file is created for the active copy of the data object in the second node, in response to the second agent determining that the backup file is created for the active copy of the data object in the second node; and instruct, by the first agent, a change tracker associated with a passive copy of the data object in the first node to begin tracking changes received from the synchronizer associated with the active copy of the data object in the second node, wherein tracked changes received from the synchronizer associated with the active copy of the data object in the second node enables a next backup operation performed on the data object to be performed as an incremental backup operation on the data object in the first node.

18. The computer program product of claim 16, wherein the active copy of the data object in the first node and the passive copy of the data object in the second node are associated with an on-line availability group.

19. The computer program product of claim 16, wherein the active copy of the data object in the first node transitions to a passive copy of the data object in the first node.

20. The computer program product of claim 16, wherein the first agent is executed in the first node, and the second agent is executed in the second node.

* * * * *